United States Patent [19]

Mittal et al.

[11] Patent Number: 5,719,800
[45] Date of Patent: Feb. 17, 1998

[54] PERFORMANCE THROTTLING TO REDUCE IC POWER CONSUMPTION

[75] Inventors: Millind Mittal, South San Francisco, Calif.; Robert Valentine, Qiryat Tivon, Israel

[73] Assignee: Intel Corporation, Santa Clara, Calif.

[21] Appl. No.: 497,853

[22] Filed: Jun. 30, 1995

[51] Int. Cl.$^6$ ..................................... G06F 1/32
[52] U.S. Cl. .................................... 364/707; 395/750
[58] Field of Search .................... 364/707; 395/750

[56] References Cited

U.S. PATENT DOCUMENTS

| | | | |
|---|---|---|---|
| 5,504,907 | 4/1996 | Steward et al. | 395/750 |
| 5,511,203 | 4/1996 | Wisor | 395/750 |
| 5,539,681 | 7/1996 | Alexander et al. | 364/707 |
| 5,546,591 | 8/1996 | Wurzbury et al. | 395/750 |
| 5,557,551 | 9/1996 | Craft | 364/707 |
| 5,560,020 | 9/1996 | Nakatani et al. | 395/750 |
| 5,576,738 | 11/1996 | Anwyl et al. | 364/707 |
| 5,579,524 | 11/1996 | Kikinis | 395/707 |

*Primary Examiner*—David H. Malzahn
*Attorney, Agent, or Firm*—Blakely, Sokoloff, Taylor & Zafman

[57] ABSTRACT

The power consumed within an integrated circuit (IC) is reduced without substantial impact on its performance for typical applications by throttling the performance of particular functional units within the IC. Artificial worst-case power consumption is reduced by throttling down the activity levels of long-duration sequences of high-power operations. The recent utilization levels of particular functional units within an IC are monitored—for example, by computing each functional unit's average duty cycle over its recent operating history. If this activity level is greater than a threshold, then the functional unit is operated in a reduced-power mode. The threshold value is set large enough to allow short bursts of high utilization to occur without impacting performance. The invention allows an integrated circuit to dynamically make the tradeoff between high-speed operation and low-power operation, by throttling back performance of localized functional units when their utilization exceeds a sustainable level. Additionally, this dynamic power/speed tradeoff can be optimized across multiple functional units within an IC or among multiple ICs within a system. Additionally, this dynamic power/speed tradeoff can be altered by providing software control over throttling parameters.

32 Claims, 5 Drawing Sheets

PERFORMANCE THROTTLING TO REDUCE IC POWER CONSUMPTION

FIELD OF THE INVENTION

The invention relates generally to reducing the power consumption of Integrated Circuits (ICs), and particularly of Very Large Scale Integration (VLSI) ICs. In particular, it relates to methods and apparatus for throttling the performance of particular functional units within an IC as needed to control worst-case power consumption.

BACKGROUND OF THE INVENTION

Reducing the power consumed by an IC has significant advantages: (1) Less power must be supplied to the IC; and (2) Less heat must be dissipated by the IC and the devices surrounding it. Reducing power consumption is especially important when an IC is going to be used in a portable computing device, such as a hand-held or notebook-size digital device.

Portable devices often operate for extended periods of time using only the power supplied by an internal battery. Because the size, weight and storage capacity of a portable battery is very limited, conserving power is critical in portable devices. The less power its ICs consume, the longer time the portable device can operate without changing or recharging its batteries.

Further, portable devices generally must dissipate the heat that their components generate without the assistance of the mechanical heat sinks or radiators and cooling fans that can easily be used in a desk-top or rack-mount computer system. When the ICs within a portable device consume less power, it operates at a lower temperature. Elevated temperatures within a computing device can make its components operate unreliably or have shorter lifetimes.

The power consumed by an IC can be reduced by lowering the speed at which it operates. For an IC fabricated using CMOS technology, which dominates the manufacture of commercial ICs, the power the IC consumes is directly proportional to both its clock rate and its operating voltage. If either clock rate or voltage is reduced, then the power consumed is reduced. Reducing the voltage also requires lowering the clock rate, unless an offsetting improvement is made in the manufacturing technology.

Because typically a fixed number of clock cycles is required to perform a particular operation, approaches to reducing IC power consumption that reduce the clock rate of the IC unfortunately also reduce performance. Thus, there is a need to reduce the power consumed by an IC without reducing its performance.

For many complex ICs, the power consumed varies widely with the task that they are performing. If more of the circuit nodes within the IC transition from one to zero or visa versa, then more power is consumed. Thus in order to specify the typical power consumption of a particular IC, it is necessary to define a benchmark sequence of operations that constitutes its typical usage. Such a benchmark would likely include substantial amounts of idle time, because computing devices designed for interactive use spend a large percentage of time waiting for user input. Once such a benchmark suite of typical operations is defined, then the power consumed by an IC in performing those operations can be measured or estimated. Such a typical power consumption value would be useful, for example, in estimating the battery life of a portable computing device under normal use.

It is desirable to reduce the power consumed by an IC by reducing or eliminating node transitions in functional units within the IC that are not being used during a particular sequence of operations. If an IC shuts down functional units when they are not being used, then typical power consumption can be significantly reduced with little or no impact on performance.

However, shutting down functional units is likely to have little impact on worst-case power consumption, which often arises when the IC is performing sequences of operations that utilize many of the functional units within the IC. Worst-case power consumption is likely to be substantially higher than typical power consumption.

Often particular functional units or logic blocks within an IC can be identified that tend to consume a disproportionate share of the IC's power—for example, the circuitry in a microprocessor that performs floating-point arithmetic. The power consumed by a microprocessor is significantly less if it is not called on to perform many floating-point operations.

The worst-case power consumption of a microprocessor might involve a sequence of floating point operations that operates on data values chosen to maximize node transitions from one to zero and visa versa, and that executes repeatedly using cache memory within the microprocessor so as to avoid reading or writing main memory. Additionally, if the microprocessor performs speculative evaluations of upcoming operations based on predicting which way a branch operation will go, power consumption would be increased by increasing the percentage of branch operations for which the microprocessor's prediction is accurate. This is because an inaccurate prediction flushes the instruction-execution pipeline, thus leaving some functional units idle as the pipeline refills.

The designer of the system in which the IC is to be used must know what the maximum power consumed by the IC will be for any possible sequence of operations. In order to make a system that incorporates an IC robust, the IC's maximum worst-case power must be known and specified. Reducing the worst-case power consumption of an IC is very important for reliability purposes, for heat dissipation purposes and for power-supply capacity purposes. Thus, there is a need to reduce the worst-case power consumed by an IC with little or no reduction in performance.

A worst-case sequence of operations, as described above, is important for estimating worst-case power consumption, which is essential for the above-mentioned purposes. But such a sequence can be considered artificial, i.e. it may not be encountered in practical applications of a microprocessor. For example, it is artificial to use a worst case power sequence based on lots of floating point computations in rating a microprocessor to be used in a portable computing device where floating point operations are infrequently used. It may not be important in typical applications of portable computing devices that long sequences of floating-point arithmetic be performed at maximum speed.

If the performance of typical operations is maintained, then it may be acceptable to throttle back the performance of less typical or artificial sequences of operations for the sake of reducing power. Thus, there is a need to reduce the worst-case power consumed by an IC without reducing performance for normal applications.

SUMMARY OF THE INVENTION

A novel method and apparatus for controlling power consumption within an IC reduces worst-case power consumption without substantially lowering performance for typical applications. Worst-case power consumption is reduced by throttling down the activity levels of long-duration sequences of high-power operations.

Within any IC, a number of particular functional units can consume inordinate amounts of power. For example, floating-point arithmetic units and cache memories are two types of functional units within a microprocessor IC that can consume substantial amounts of power. The invention allows IC designers to identify any number of such high-power functional units within the IC they are designing, and place each under the control of its own power controller. Further, the invention allows IC designers to place the IC they are designing as a whole under the control of an overall power controller. In the case of a microprocessor IC, the power consumption as a whole can effectively be throttled by lowering either the instruction retirement rate or the instruction issue rate.

In one embodiment, the power controller comprises an activity monitor and a mode controller. The activity monitor tracks the recent utilization level of a particular functional unit within the IC—for example, by computing its average duty cycle over its recent operating history. If this activity level is greater than a threshold, then the mode controller switches the functional unit to operate in a reduced-power mode. The threshold value is set large enough to allow short bursts of high utilization to occur without impacting performance.

Embodiments of the invention exist that add only minimal cost and complexity to the IC's design—for example, one up-down counter and some control circuitry per each functional unit being controlled. On the other hand, the invention is flexible in that it encompasses a wide variety of techniques for monitoring utilization of different functional units, for reducing the power they consume and for setting their throttling parameters.

In accordance with another aspect of the invention, the dynamic power/speed tradeoff of the invention can be optimized across multiple functional units within an IC or among or among multiple ICs within a system. The invention includes optimization schemes wherein the maximum power consumed by a particular functional unit can be increased or decreased depending on the power being consumed elsewhere within the same IC, or on other ICs within the same system.

In accordance with another aspect of the invention, the dynamic power/speed tradeoff of the invention can be controlled by software, such as platform software executing at system boot time, or operating system software, or possibly even applications software.

BRIEF DESCRIPTION OF THE DRAWINGS

The invention is illustrated in the following drawings, in which known circuits are shown in block-diagram form for clarity. These drawings and the following textual description are for explanation and for aiding the reader's understanding, but the invention should not be taken as being limited to the preferred embodiments and design alternatives illustrated therein.

DETAILED DESCRIPTION OF THE INVENTION

Overview

Figure 1B:
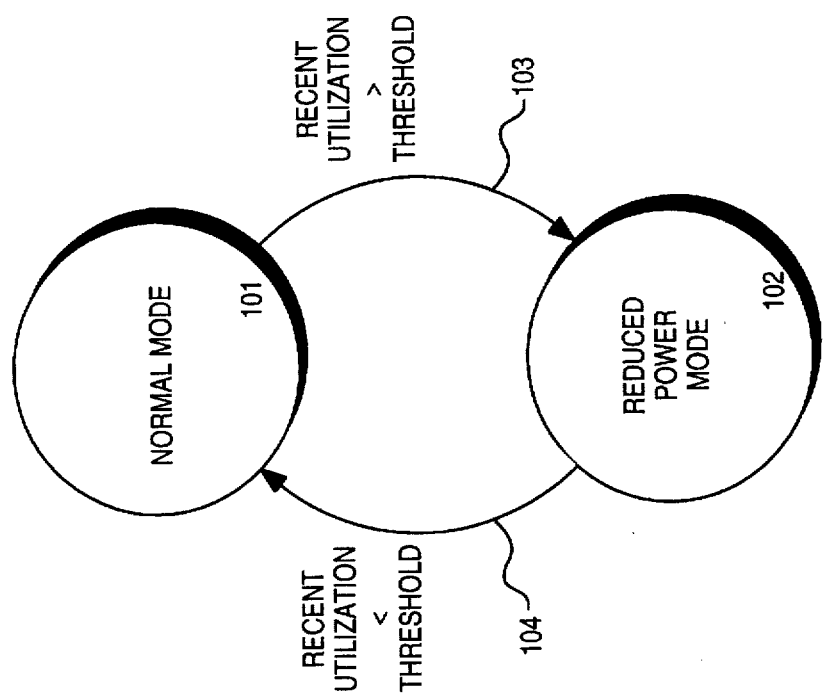
FIG. 1(b) is a state diagram showing the transitions of a functional unit from its normal mode or state to its reduced-power mode and back again, according to the invention.

The invention allows an IC to dynamically make the tradeoff between high-speed operation and low-power operation, by throttling back performance of a functional unit when its recent utilization exceeds a sustainable level. Thus, the invention allows the IC to dynamically throttle back the execution rate of maximum worst-case power consumption sequences of operations so as to not exceed the worst-case power consumption allowable, thus avoiding reliability, heat dissipation or power supply problems.

At the same time, the invention minimizes any performance impact that such throttling has on realistic sequences of operations. This power reduction is done in a way that does not have a substantial affect on the performance of the IC for typical tasks. The localized control and the threshold value that the invention provides minimize performance impacts. Further, the performance impact is predictable and repeatable for those sequences of operations that the invention does throttle.

The purpose of an IC is not to run some artificial, non-realistic maximum worst-case power consumption sequence of operations at high performance. Rather, it is to run realistic or typical sequences of operations at high performance. In some cases, there can be a substantial difference in power consumption between such the typical worse case power consumption and the artificial worst-case power consumption. The effectiveness of adding the invention to a particular IC design depends on the amount of difference between that design's artificial worst-case power consumption and its typical worst-case power consumption.

A preferred way to look at typical worst-case power consumption is to look at realistic sequences of operations typically used to perform actual work and identify from among those sequences the particular sequence that maximizes power consumption. Such a sequence could be determined by profiling the power consumption of sequences of operations in a mix of popular software programs, and choosing from among those sequences the sequence with the highest power consumption.

According to the present invention, artificial sequences of operations that keep high-power functional units active for longer than a threshold are performed in low power mode. Thus, the invention prevents the IC from consuming power in excess of its specified maximum regardless of the sequence of operations it is performing. This is critical in the case of malicious software, such as a virus, that might deliberately attempt to damage a microprocessor IC or the system that includes the microprocessor by causing excess power consumption.

The invention is independent of the technique of reducing overall power consumption by reducing voltage and/or clock rate. It can be used in conjunction with that approach, or in lieu of that approach. For example, if an IC would operate at 100 MHz except for excessive worst-case power consumption at that speed, then (i) the clock rate could be lowered to reduce worst-case power consumption; (ii) the invention could be employed to reduce worst-case power consumption; or (iii) a combination of both techniques could be employed. For some power-limited designs, using the invention could make the difference in whether or not a particular target clock rate can be met.

Figure 1A:
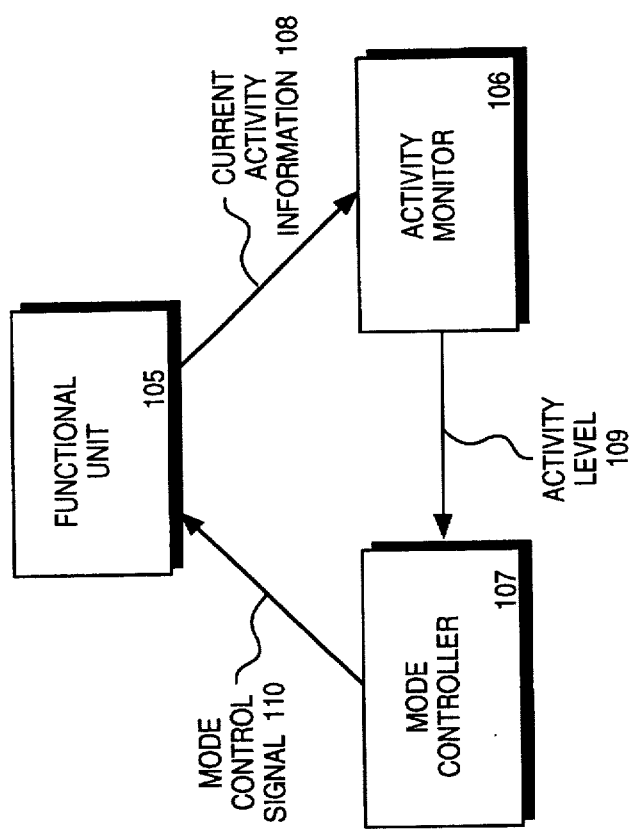
FIG. 1(a) shows the blocks of logic circuitry of the invention.

FIG. 1(a) is a block diagram of one embodiment of the invention. Functional unit 105 provides current activity information 108 to activity monitor 106. Current activity information 108 describes what tasks or operations functional unit 105 is currently performing, or indicates that it is currently idle. Based on this current activity information 108, activity monitor 106 generates activity level 109, and provides it to mode controller 107. Activity level 109 could be a number, a set of signals each indicating that the activity level is within a specified range, or even a single bit. Based on activity level 109, mode controller 107 generates mode control signal 110, which is coupled to functional unit 105.

Mode controller 107 switches functional unit 105 between a normal mode of operation 101 (typically one with high performance and high power consumption), and a reduced-power mode 102 (typically one lower in performance and lower in power consumption).

Activity monitor 106 monitors the recent utilization of functional unit 105, via activity level 109. Activity level 109 could be a special signal generated by functional unit 105, or it could simply be the commands that functional unit 105 receives and responds to. Monitoring the recent utilization could consist of, for example, computing the average duty cycle of the functional unit over the preceding thousand cycles. If this activity level exceeds a threshold, then mode controller 107 places functional unit 105 in reduced-power mode. Further, if it is desired to monitor the overall power consumption of an IC, then its substrate temperature could be measured and this value used as the activity level of the invention.

FIG. 1(b) is a state-transition diagram of the operation of the invention. It shows how mode controller 107 causes functional unit 105 to transition between normal mode 101 and reduced-power mode 102. When the functional unit is in normal mode 101 and the recent utilization is greater than the threshold, then transition 103 occurs in which the mode controller places the functional unit in reduced-power mode 102. Similarly, when in reduced-power mode 102 and the recent utilization is less than the threshold, then the mode controller takes transition 104 to restore the functional unit it controls to normal mode 101.

Preferably, the threshold value used is set based on profiling the realistic worst-case power consumption benchmark being used in the design of this particular IC. The threshold is preferably set large enough that all or most bursts of high activity occurring in this benchmark are shorter than this threshold, and thus can be speedily executed with little or no throttling.

In the case where heat dissipation is the primary determinant of how much power can be consumed, the threshold may be on the order of a hundred thousand (100,000) operations. A spike in power consumption of one millisecond (1 ms) may well be tolerable from a thermal point of view. If the IC is clocked at 100 MHz, then a 1 ms spike is 100,000 clock cycles. A substantial amount of high-speed computation can be performed in a high-power burst of 100,000 clock cycles. Thus, the invention allows bursts of high activity, unless their duration exceeds the threshold.

Design Alternatives for Monitoring Utilization

The invention is flexible in that it encompasses a wide range of methods and devices for monitoring activity levels. These design alternatives range from very simple to quite complex. In fact, each functional unit controlled may have a different monitoring technique to which it is best suited.

A particularly simple monitoring technique is to use an up/down counter as an activity-level register whose contents indicate the current utilization of the functional unit being monitored. In a simple implementation, the up/down counter increments its contents by one during each clock cycle that the functional unit is active and decrements its contents by one for each clock cycle the functional unit is inactive. A slightly more complex design alternative is to increment and decrement not for each clock cycle, but rather once per each complex operation that the functional unit performs and decrement for each corresponding period that the functional unit is inactive. Another design alternative is for the activity monitor to increment by a value other then one, to decrement by a value other than one, or both.

If the value by which the contents of the activity-level register is increased during each active cycle equals the value by which the activity-level register is decreased during each inactive cycle, then the activity monitor functions to enforce a maximum sustainable duty cycle of fifty percent (50%). In an up-down counter implementation, care must be taken that the contents of the activity-level register never go below zero, or alternatively that a negative number as the value in the activity-level register is distinguished from a roll-over condition in which the value becomes too large in the positive direction.

The current value of the activity-level register is compared against a threshold value. The threshold value is independent of the maximum sustainable duty cycle. It is set so as to be large enough so that short bursts of high activity can execute at full speed. Preferably, the threshold value is set by profiling the sequence of operations selected as the realistic worst-case power consumption benchmark. The threshold value can be thought of as a deficit limit which the functional unit can not exceed without having its speed throttled down. Carrying this analogy further, the current value of the activity-level register can be thought of as its current power deficit.

If a maximum sustainable duty cycle value other than fifty percent (50%) is desired, then it is necessary to have the active increment be unequal in magnitude to the inactive decrement. For example, an increment of two and a decrement of one produce a thirty-three (33%) percent maximum sustainable duty cycle. The sustainable duty cycle is given by Equation 1:

$$\text{Equation 1: } SDC = \frac{ID}{(ID + AI)}$$

SDC represents the sustainable duty cycle, AI represents the active increment amount and ID represents the inactive decrement amount. In Equation 1, AI and ID are each positive and represent the absolute value of the increment and decrement values actually used. Preferably the active increment value is positive and the inactive decrement value is negative.

If the active increment, AI, value is chosen to be one, then the maximum number of consecutive cycles that the functional unit can be active is equal to the threshold value. In general, the maximum burst length is given by Equation 2:

$$\text{Equation 2: } MBL = \frac{TH}{AI}$$

MBL represents the number of functional-unit cycles in the maximum burst length and TH represents the threshold value used to compare with the current activity value.

More sophisticated activity monitoring schemes are possible within the scope of the invention. For example, the type of operation the functional unit is asked to perform could be monitored by an activity monitor that associated a particular activity increment with each possible type of operation. In such a scheme, the contents of the activity-level register could simply decrement at a constant rate.

Design Alternatives for Reducing Power

The invention is flexible in that it encompasses a wide range of design alternatives for reducing the power of the functional unit that it controls. These design alternatives can range from very simple to quite complex. In fact, each functional unit controlled may have a different power reduction technique for which it is most suited.

A simple way to reduce the power consumed by the functional unit is to reduce its clock rate. This could be performed by dividing the clock which it normally receives by two, or by suppressing every other clock pulse. In the case where the maximum sustainable duty cycle is fifty percent, then dividing the clock provided to the functional unit by two when the threshold is exceeded enforces this maximum duty cycle. Alternatively, the clock rate could be reduced by a factor other than two.

Many ICs include cache memory to keep an internal, and thus quickly assessable, copy of data that is available at a slower speed in some type of external memory. Cache memory is used for performance reasons. Much less delay is involved in accessing the information from an on-chip cache than in accessing it from a device external to the IC.

Cache memories can be major consumers of power within an IC. Thus, it may be desirable to place on-chip cache memories under the control of the invention. A simple scheme for reducing the power consumption of the cache memory is to force access to the external memory (even if a copy of the data is present in the on-chip cache), when necessary to reduce power consumption because the cache memory's maximum sustainable duty cycle has been exceeded.

It will be clear to one skilled in the art that an IC may have other on-chip functional units whose functions can be performed at lower speed by off-chip circuits. These are candidates for the same power reduction technique as used for cache memory—that is, have the off-chip circuit perform the operation when needed to reduce on-chip power consumption.

In rare cases it may be cost effective to include on an IC two complete implementations of a particular functional unit—one being high speed and high power and the other being low speed and low power. In this case, the mode controller of the invention selects which is to be used based on the current utilization of the functional unit and the current value of its threshold parameter.

In the case of a microprocessor that performs speculative instruction execution, instructions are started through the instruction-evaluation pipeline anticipating that a conditional branch instruction will (or will not) be taken. If the prediction as to whether or not the branch is taken is correct, then a significant performance speed-up is achieved. But sometimes the branch prediction is wrong and as soon as this is known, then the results of the speculative evaluations are discarded and the correct instructions are started through the instruction-evaluation pipeline. A preferred reduced-power mode for a microprocessor that performs speculative instruction execution may be to reduce or eliminate speculative instruction execution.

Another example of speculative operation is cache prefetching. Many ICs with on-chip cache memories anticipate that instruction or data memory accesses will be sequential. To increase performance, they prefetch to the instruction or data cache some number of words adjacent to the currently requested instruction or data address. A preferred reduced-power mode for a cache memory may comprise disabling some or all of its speculative prefetches. In general, a preferred reduced-power mode for any functional unit may be to reduce or eliminate its speculative activities.

Controlling a Floating-Point Arithmetic Unit by an UP/Down Counter

Figure 2:
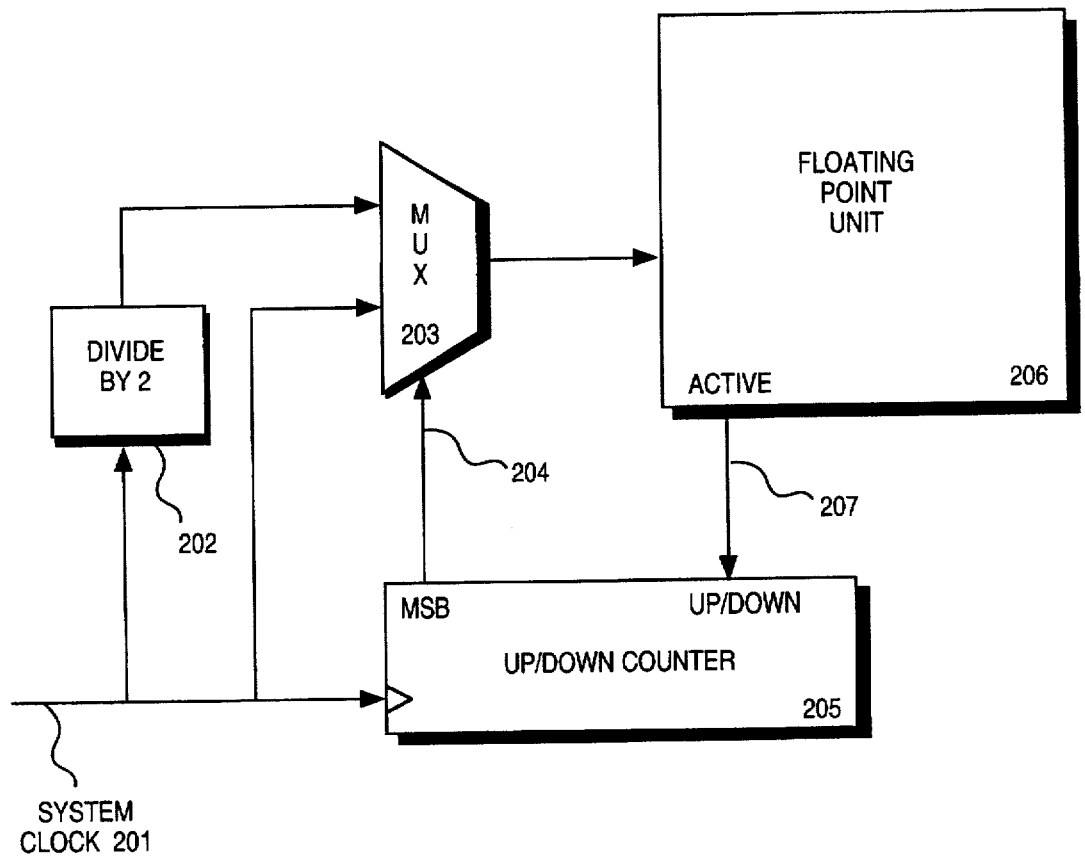
FIG. 2 shows the blocks of logic circuitry in an embodiment of the invention that enforces a 50% maximum sustainable duty cycle on a floating point functional unit.

FIG. 2 shows an embodiment of the invention that enforces a maximum sustainable duty cycle of fifty percent (50%) on floating-point unit 206. In its normal operating mode, multiplexer 203 passes system clock 201 on to the clock input of floating-point unit 206. In its reduced-power-mode, multiplexer 203 passes the output of divide-by-two circuit 202 on to the clock input of floating-point unit 206, thus cutting both its speed and power consumption in half.

Floating-point unit 206 provides active signal 207 to the up/down control input of up/down counter 205. For each cycle of system clock 201 for which active signal 207 is true, up/down counter 205 increments its contents by one. For each cycle of system clock 201 for which active signal 207 is false, up/down counter 205 decrements its contents by one. If a decrement would take its contents below zero, then up/down counter 205 stays at zero.

The select input of multiplexer 203 is driven by most-significant-bit output 204 from up/down counter 205. This bit provides the feedback to control whether or not the invention places floating point unit 206 into reduced power mode. Thus in this embodiment, the threshold is predetermined and must be a power of two. Which power of two is used is selected by the number of bits in up/down counter 205. When the contents of up/down counter 205 is large enough that its most significant bit is a one, then the reduced-power mode is entered and multiplexer 203 selects the output of divide by two circuit 202 to clock floating-point unit 206.

Clocking floating-point unit 206 at half the frequency has the effect of enforcing a fifty percent (50%) maximum duty cycle on floating-point unit 206 during the period that it is in reduced-power mode i.e., the period that most-significant-bit 204 is a one. During this period, floating-point unit active signal 207 is true for every other cycle of system clock 201.

The increment magnitude and decrement magnitude used in this embodiment of the invention are equal; that is the contents of up/down counter 205 are either increased or decreased by one. Therefore, the maximum sustainable duty cycle allowed for floating-point unit 206 is fifty percent (50%). Therefore, if the sequence of operations being performed by the IC attempts to sustain a floating-point duty cycle of more than fifty percent (50%) for longer than the burst allowed by the predetermined threshold, then the floating point unit's performance is throttled down to stay within a duty cycle of fifty percent.

Controlling a Cache by a Programmable Activity Monitor

Figure 3:
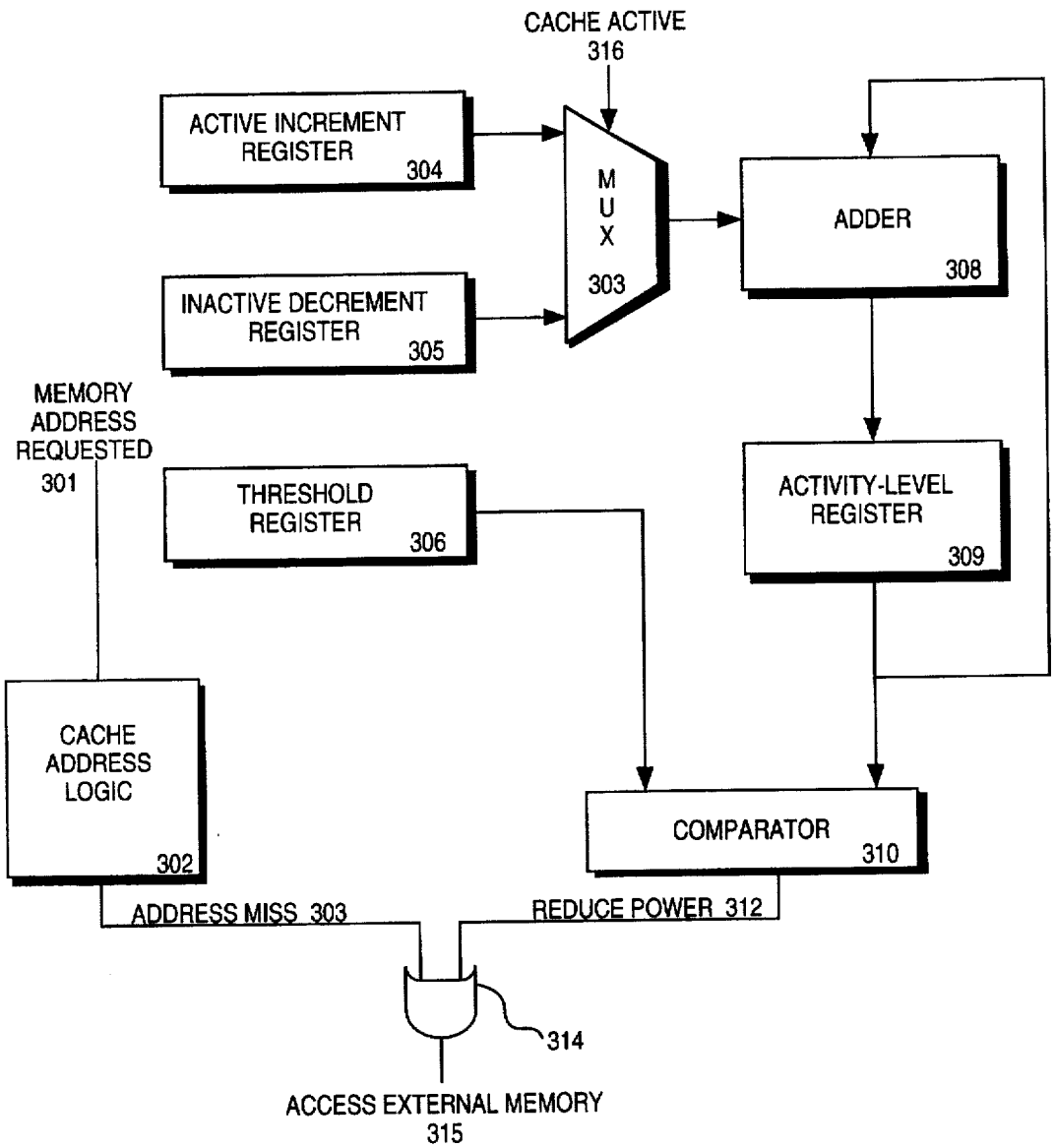
FIG. 3 shows the blocks of logic circuitry in an embodiment of the invention that enforces a programmable maximum sustainable duty cycle on a cache memory.

FIG. 3 shows an embodiment of the invention in which the power consumption of a cache memory is controlled in a programmable manner. The activity monitor in this embodiment of the invention functions as follows: Cache active signal 316 is provided from the on-chip cache to the select input of multiplexer 307. Based on the current state of cache active signal 316, either the value in active increment register 304 or the value in inactive decrement register 305 is presented as a first operand input to adder 308. A second operand input to adder 308 is provided from the current value of activity-level register 309. Adder 308 sums the values of these two operand inputs and provides the result as the new current value to be stored in activity-level register 309.

The mode controller in this embodiment of the invention functions as follows: The control signal cache unavailable 312 is the result of comparator 310 determining that the contents of activity-level register 309 are larger than the contents of threshold register 306. When it asserts control signal cache unavailable 312, the cache memory is put into its reduced-power mode, i.e. accesses to it are denied. This preferably forces the processor into an idle or wait state if it attempts to reference the cache when cache unavailable 312 is asserted.

The values in threshold register 306, inactive decrement register 305, and active increment register 304 can be programmable by a variety of mechanisms not shown in FIG. 3. These values are the throttling parameters associated with the functional unit being controlled. The values in active increment register 304 and inactive decrement register 305 must be of opposite signs—one must be negative and one positive.

As explained above in connection with Equation 1, the values of active increment register 304 and inactive decrement register 305 can be selected to enforce a wide range of maximum duty cycles on the on-chip cache. Further, the value of threshold register 306 can be programmed to vary the maximum duration of bursts of high cache activity. This enables high performance on sequence of operations that require bursts of cache accesses—at least for those bursts of duration within tolerable power-consumption limits.

Design Alternatives for Programmability

The invention is flexible in that it encompasses a wide range of design alternatives for programming or setting the contents of the throttling parameters associated with a particular functional unit, i.e. of threshold register 306, inactive decrement register 305, and active increment register 304. They could be read-only values programmed to the desired value like a read-only memory (ROM) by varying one or two of the mask layers used to fabricate the IC. They could be programmable road-only values programmed like a programmable read-only memory (PROM) by a one-time-only writing process such as blowing a fusible link for each bit. These design alternatives allow different versions of the IC with different power consumption and performance specifications.

Alternatively, programming the throttling-parameter values could be under software control—either under control of the platform software or basic input/output system (BIOS) at system boot or power-on self test (POST) time, or dynamically under control of the operating system, or perhaps under limited dynamic control by the applications software. If programmed at system boot time, the choice of values could reflect the power supply and heat dissipation characteristics of the system in which the IC is used. For example, substantially different values could be used for a portable device versus a desk-top device. If programmed by applications software, the choice of values could reflect the software setting itself a power-consumption budget rich in floating-point operations but meager in cache accesses, or visa versa. Preferably the hardware would enforce constraints on any throttling parameter values set by software so as to maintain overall power consumption within specifications—for example, an increased value for one parameter might force an automatic decrease in another.

Alternatively, the values could be altered dynamically as the IC operates as part of coordinating power consumption across multiple functional units as discussed below. In this context, the current value of activity-level register 309 can be considered one of the throttling parameters that can be decreased to give its associated functional unit a one-time performance boost or increased to give it a temporary restriction in power consumption.

Coordinating Power Consumption Across Multiple Functional Units

Figure 4:
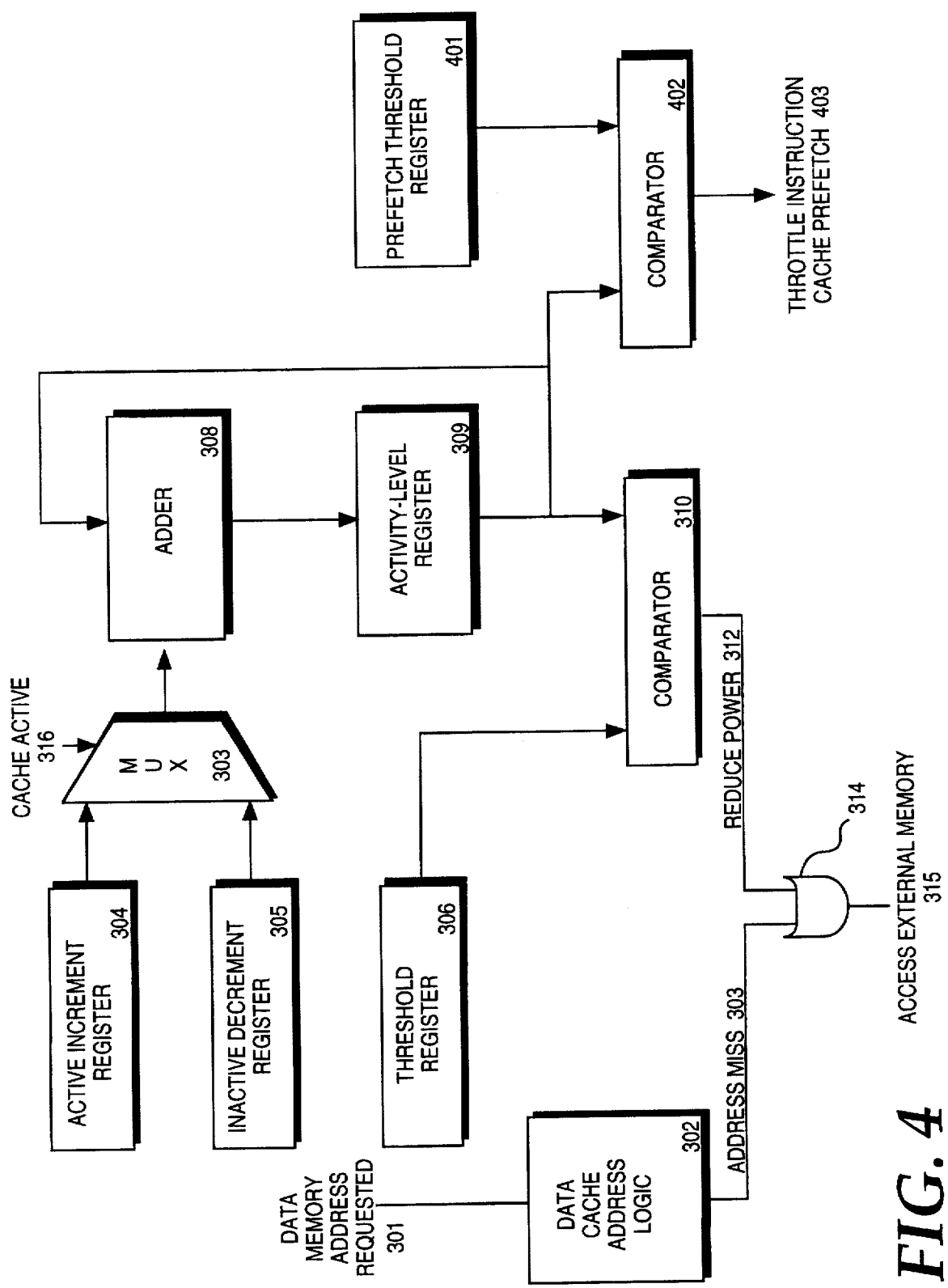
FIG. 4 shows the blocks of logic circuitry in an embodiment of the invention that disables instruction cache prefetching based on the recent utilization level of the data cache.

FIG. 4 is a block diagram of an embodiment of the invention for a microprocessor or other IC that includes both a data cache and an instruction cache, that performs speculative prefetches into the instruction cache, and that disables speculative instruction-cache prefetching based on the recent utilization of the data cache.

An activity-level monitor and mode controller enforce a maximum sustainable duty cycle on accesses to a data cache (not shown). Blocks and signals 301 to 316 function as do their correspondingly numbered counterpart in FIG. 3. Thus, when the maximum sustainable duty cycle for data cache accesses is exceeded for more than the threshold duration, then the reduced-power mode is entered and the processor may be forced to be idle for a cycle or more if it attempts to reference the data cache.

Additionally, comparator 402 compares the current value in activity-level register 309 with the value in prefetch threshold register 401. Based on the results of this comparison, the control signal throttle instruction-cache prefetch 403 is generated if the activity level exceeds this threshold. This control signal restricts speculative prefetches into the instruction cache (not shown), i.e. it disables all prefetches, or at least reduces their rate.

The premise of this embodiment is that as long as the activity level in the data cache is below a threshold, then speculative prefetches into the instruction cache should be performed. They may speed up execution and they are currently affordable in terms of power consumption. But if the data cache activity level exceeds this threshold, then speculative prefetches into instruction cache should not be performed. The power they consume is not currently affordable. Further, the performance speed-up given up may be marginal because speculative prefetches have no benefit when the instruction accesses are in a particular sequence of operations happen to be non-sequential.

Figure 5:
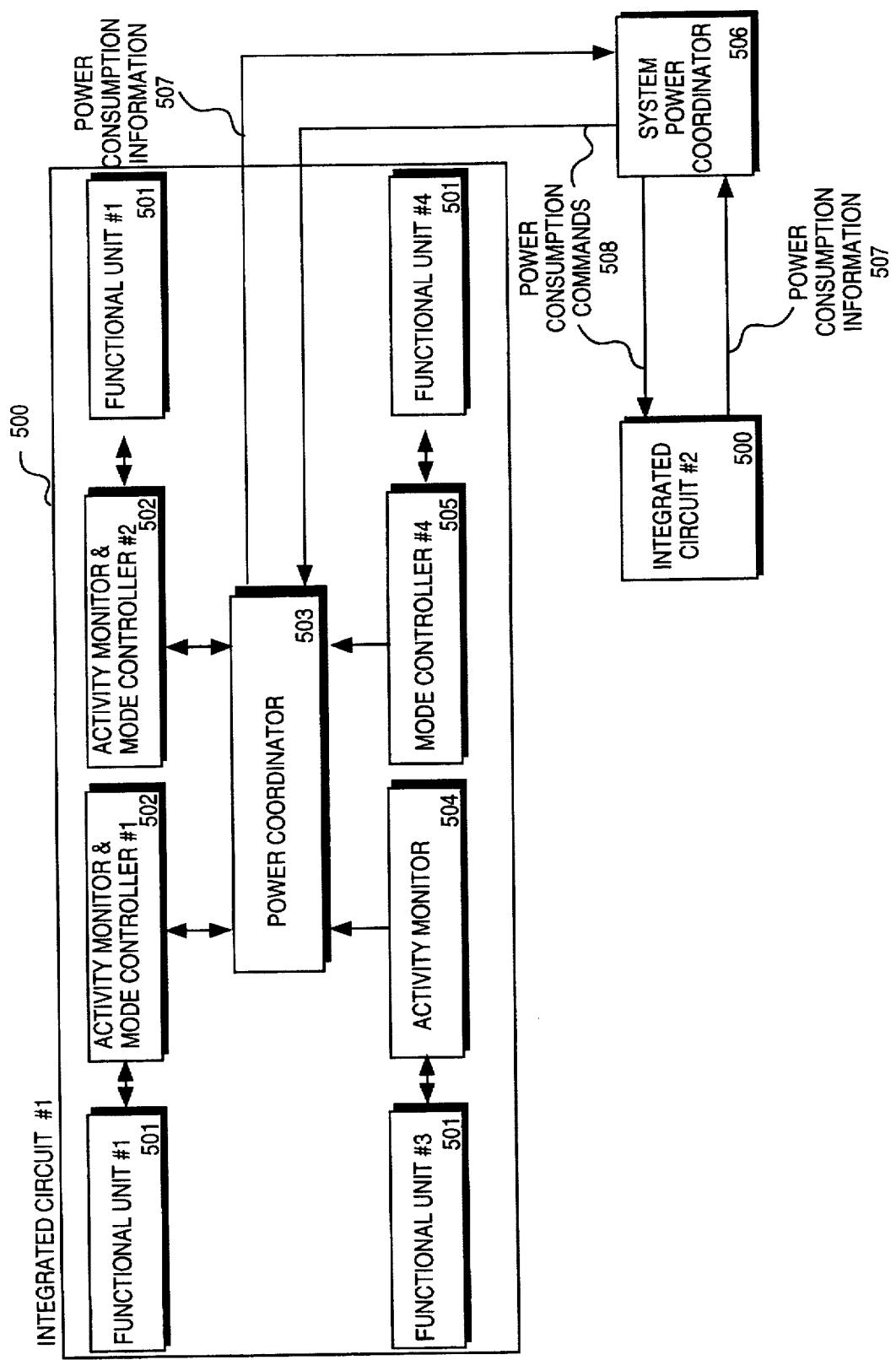
FIG. 5 shows the blocks of logic circuitry in an embodiment of the invention where a power coordinator reads the activity levels of various functional units within an IC and alters, based on those activity levels, the throttling parameters of other functional units to dynamically optimize the power/speed tradeoff.

FIG. 5 is a block diagram of an embodiment of the invention that includes a power coordinator to dynamically optimize the power/speed tradeoff allowed by the invention across multiple functional units. In general, power coordinator 503 can read the activity levels associated with one or more functional units 501 within integrated circuit #1 and alter their throttling parameters, i.e. their associated active increment, inactive decrement, threshold or activity-level values.

Integrated circuit #1 may include a number of additional functional units, such as Functional Unit #4, whose power consumption is not monitored—perhaps because it is constant or relatively small, or it is the preferred functional unit to throttle. A high-power functional unit with minimal performance impact might be a good candidate for being the first functional unit to throttle.

Integrated circuit #1 may include a number of additional functional units, like Functional Unit #3, whose power consumption is not controlled—perhaps because the power consumed is relatively small, or there is no cost-effective technique for controlling its power consumption, or there is a very substantial performance impact of reducing its power consumption that makes it an unlikely candidate for such control.

Based on current activity levels of any or all functional units being monitored, power coordinator 503 can alter the active increments and/or inactive decrements associated with a particular functional unit 501, thus changing that functional unit's maximum sustainable duty cycle.

Similarly, power coordinator 503 can alter the threshold associated with a particular functional unit 501. This might be done to allow longer bursts of high activity in that particular functional unit. Alternatively, this might be done in conjunction with changing that unit's active increment value in order to keep the maximum high-power burst length constant, as discussed in connection with Equation 2 above.

Similarly, power coordinator 503 can alter the current activity level associated with a particular functional unit 501, thus giving that functional unit a one-time performance boost or power restriction.

As shown in IC #1 in FIG. 5, functional units #1 and #2 have an associated activity monitor & mode controller 502. Functional unit #3 has an associated activity monitor 504, but no mode controller. Functional unit #4 has an associated mode controller 505, but no activity monitor. Activity monitor & mode controller 502, activity monitor 504 and mode controller 505 are different types of local power controllers, whose operation is coordinated by power coordinator 503 altering their throttling parameters.

For example, functional unit #1 could be an instruction cache and functional unit #2 could be a data cache, each with an associated activity monitor and power controller, similar to that shown in FIG. 3. Functional unit #3 could be a floating-point arithmetic unit. Functional unit #4 could be the unit that performs instruction cache prefetching, as discussed in conjunction with FIG. 4.

In this example, power coordinator 503 could throttle or disable instruction cache prefetching based on whether or not the total of the current activity-level values within each activity monitor & mode controller 502 and each activity monitor 504 exceeds a threshold. The premise here is that speculative instruction fetching is the first activity to be throttled down, because the performance penalty paid by doing that is smaller than that of the reduced-power mode of the other functional units.

Additionally in this example, power coordinator 503 could raise or lower the maximum sustainable duty cycle for each of instruction cache functional unit #1 and data cache functional unit #2 based on whether or not the current activity level associated with floating-point functional unit #3 exceeds a threshold. The premise here is that floating-point functional unit #3 is never throttled because the performance penalty paid by doing that is larger than that paid by backing off on the maximum duty cycles of the caches. In practice this premise is true for some architectures performing some types of applications, and for other architectures or types of applications it would be the other way around. The monitoring and control schemes of the present invention are flexible enough to accommodate a wide range of such variations.

Additionally in this example, power coordinator 503 could raise or lower the maximum sustainable duty cycle for the instruction cache functional unit #1 and the data cache functional unit #2 based on whether or not the current activity level associated with the other cache exceeds a threshold. The premise here is that if one is relatively inactive, then a higher sustained duty cycle can be afforded in the other.

The validity of these or any other premises about the best techniques for optimizing performance in the context of worst-case power conservation is preferably determined by profiling the realistic worst-case power benchmark described above. Based on such profiling, estimates and performance tradeoffs can be made between the normal mode and the reduced-power mode of each functional unit being controlled by the invention. Each such premise can be validated by simulating it against the realistic worst-case power benchmark.

Also shown in FIG. 5 is system power coordinator 506 and integrated circuit #2, which show how the dynamic power/speed tradeoff of the invention can be hierarchically extended to the level of multiple-IC systems. Each integrated circuit 500 provides power consumption information 507 to system power coordinator 506. System power coordinator 506 provides power consumption commands 507 to each integrated circuit 500. The possible interactions between system power coordinator 506 and each power coordinator 503 within each IC 500 are analogous to the interactions discussed above between power coordinator 503 and the activity monitors/mode controllers 502, 504 and 505.

For example, a personal computer system could comprise a microprocessor IC and one or more peripheral controller ICs—a display controller IC, a modem communications IC, a disk controller IC, etc. The system power coordinator could raise or lower the power that the microprocessor can currently consume based on the recent utilization of the peripheral controller ICs.

The preferred embodiment of the invention and various alternative embodiments and designs are disclosed herein. Nevertheless, various changes in form and detail may be made while practicing the invention without departing from its spirit and scope or from the following claims.

We claim:

1. A microprocessor with controlled power consumption, comprising:

a storage unit configured to store a dynamically alterable activity threshold;

a floating-point unit operable to compute floating point arithmetic in a normal mode and in a reduced-power mode;

an activity monitor, coupled to said storage unit, operable to monitor utilization of said floating-point unit; and a mode controller, coupled to said storage unit and to said activity monitor, operable to place said storage unit in said reduced-power mode when said utilization is greater than said activity threshold.

2. The microprocessor of claim 1, further comprising:
a unit, coupled to said floating-point unit and responsive to a power-reduction signal from said mode controller, to reduce the rate at which said floating-point unit is clocked when said floating-point unit is in said reduced-power mode.

3. A microprocessor with controlled power consumption, comprising:
an activity threshold memory configured to store a dynamically alterable threshold;
a cache memory operable to store information also stored in an external memory and operable in a normal mode and in a reduced-power mode;
an activity monitor, coupled to said cache memory, operable to produce an activity level indicative of utilization of said cache memory; and
a mode controller, coupled to said activity threshold memory and to said activity monitor, operable to place said cache memory in said reduced-power mode when said activity level is greater than said activity threshold.

4. The microprocessor of claim 3, further comprising:
a unit, coupled to said cache memory and responsive to a power-reduction signal from said mode controller, operable to access said external memory when said cache memory is in said reduced-power mode.

5. The microprocessor of claim 3, further comprising:
a unit, coupled to said cache memory and responsive to a power-reduction signal from said mode controller, operable to throttle prefetches of said information into said cache memory when said cache memory is in said reduced-power mode.

6. The microprocessor of claim 3 wherein said stored information comprises instructions, and said microprocessor further comprises:
an instruction-execution unit, coupled to said cache memory, operable to execute said instructions.

7. The microprocessor of claim 3 wherein said stored information comprises data, and said microprocessor further comprises:
a data-computation unit, coupled to said cache memory, operable to perform computations on said data.

8. A microprocessor with controlled power consumption, comprising:
a data-computation unit, operable to perform computations on data stored in an external memory;
a data cache, coupled to said data-computation unit and to said external memory, operable to store said data;
an activity monitor, coupled to said data cache, operable to indicate the recent utilization of said data cache;
an instruction-execution unit, operable to execute instructions from said external memory;
an instruction cache, coupled to said instruction-execution unit and to said external memory, operable to store said instructions and operable in a normal mode and in a reduced-power mode; and
a mode controller, coupled to said instruction cache and to said activity monitor, operable to place said instruction cache in said reduced-power mode when said recent utilization is greater than a threshold.

9. A microprocessor with controlled power consumption, comprising:
an instruction-execution unit, operable to speculatively execute instructions;
an activity monitor, coupled to said instruction-execution unit, operable to indicate the recent utilization of said instruction-execution unit; and
a mode controller, coupled to said instruction-execution unit and to said activity monitor, operable to throttle said speculative instruction execution, and not to throttle non-speculative instruction execution, when said recent utilization is greater than a threshold.

10. An IC having controlled power consumption, comprising:
a functional unit operable in a normal mode and in a reduced-power mode;
an activity monitor, coupled to said functional unit, operable to indicate utilization of said functional unit; and
a mode controller, coupled to said functional unit and to said activity monitor, operable to place said functional unit in said reduced-power mode when said utilization is greater than a threshold indicated by a throttling parameter associated with said functional unit, said throttling parameter being dynamically adjustable to alter said threshold.

11. The IC of claim 10, further comprising:
a unit, coupled to said functional unit and responsive to said mode controller, operable to reduce the rate at which said functional unit is clocked when said functional unit is in said reduced-power mode.

12. The IC of claim 10 wherein said functional unit comprises a cache memory to store information also stored in an external memory, and said IC further comprises:
a unit, coupled to said functional unit and responsive to said mode controller, operable to access external memory when said functional unit is in said reduced-power mode.

13. The IC of claim 10 wherein said functional unit comprises a cache memory to store information from an external memory, and said IC further comprises:
a unit, coupled to said functional unit and responsive to said mode controller, operable to throttle prefetches from said external memory to said cache memory when said functional unit is in said reduced-power mode.

14. The IC of claim 10, wherein said functional unit is operable to perform speculative operations, and said IC further comprises:
a unit, coupled to said functional unit and responsive to said mode controller, operable to throttle said speculative operations when said functional unit is in said reduced-power mode.

15. The IC of claim 10, wherein
said functional unit is operable in cycles; and
said activity monitor indicates said utilization by changing an activity level by a first amount for each of said cycles that said functional unit is active and changing said activity level by a second amount for each of said cycles that said functional unit is inactive, said throttling parameter comprising said activity level.

16. The IC of claim 15, further comprising:
a power coordinator operable dynamically to alter said throttling parameter.

17. An integrated circuit with controlled power consumption, comprising:
a functional means for performing a function operable in a normal mode and in a reduced-power mode;
a monitor means, coupled to said functional means, for calculating an activity level indicative of utilization of said functional means; and
a control means, coupled to said functional means and to said monitoring means, operable to place said functional means in said reduced-power mode when said activity level is greater than a predetermined threshold, the predetermined threshold being dynamically adjustable.

18. A method of controlling power consumption within an integrated circuit (IC), comprising:

monitoring utilization of a functional unit within said IC;

dynamically adjusting an activity threshold associated with the functional unit;

comparing said utilization with said activity threshold;

placing said functional unit in a normal mode when said utilization is less than said activity threshold; and placing said functional unit in a reduced-power mode when said utilization is greater than said activity threshold.

19. The method of claim 18, wherein said reduced-power mode comprises reducing the rate at which said functional unit is clocked.

20. The method of claim 18, wherein said functional unit comprises a cache memory and said step of placing said cache memory in said reduced-power mode comprises diverting accesses to the cache memory to an external memory.

21. The method of claim 18, wherein said functional unit performs speculative operations and said step of placing said functional unit in said reduced-power mode comprises throttling execution of said speculative operations.

22. The method of claim 18, wherein said monitoring comprises changing an activity level by a first amount for each cycle in which said functional unit is active and changing said activity level by a second amount for each cycle in which said functional unit is inactive.

23. The method of claim 22, further comprising:

dynamically determining said first amount.

24. The method of claim 22, further comprising:

dynamically determining said second amount.

25. An integrated circuit (IC) having controlled power consumption, comprising:

a first functional unit within said IC;

a second functional unit within said IC, said second functional unit being operable in a normal mode and in a reduced-power mode and having an activity level related to an activity level of the first functional unit;

an activity monitor within said IC, coupled to said first functional unit, operable to produce an activity level indicative of the activity level of said first functional unit; and a controller within said IC, coupled to said second functional unit and to said activity monitor, operable to place said second functional unit in said reduced-power mode when said activity level of said first functional unit is greater than a threshold.

26. An integrated circuit (IC) having controlled power consumption, comprising:

a plurality of functional units each operable in a normal mode and in a reduced-power mode;

a plurality of local power controllers, each associated with at least one of said functional units and each having throttling parameters, operable to control the power consumption of said associated functional unit in accordance with the current values of said throttling parameters; and a power coordinator, coupled to at least two of said local power controllers, operable to read a throttling parameter in a first one of said coupled local power controllers and, based thereon, operable to alter a throttling parameter in a second one of said coupled local power controllers.

27. A method of controlling the power consumption of an integrated circuit (IC), comprising:

monitoring utilization of a first functional unit within said IC to produce a first activity level; and controlling the mode of operation of a second functional unit within said IC, said second functional unit having a second activity level related to said first activity level of said first functional unit, and being operable in a normal mode and in a reduced-power mode by placing said second functional unit in said reduced-power mode when said first activity level is greater than a threshold.

28. A method of controlling power consumption of an integrated circuit (IC), comprising:

controlling the mode of operation of a plurality of functional units within said IC based on a set of throttling parameters, each said functional units being operable in a normal mode and in a reduced-power mode; and coordinating the power consumption of said plurality of functional units by dynamically monitoring and altering said throttling parameters.

29. An integrated circuit (IC) with power consumption controllable by a processor, comprising:

a functional unit operable in a normal mode and in a reduced-power mode;

an activity monitor, coupled to said functional unit, having a throttling parameter, operable to generate an activity level indicative of utilization of said functional unit;

a memory unit configured to store a throttling parameter, said throttling parameter being dynamically alterable by said processor, and a mode controller, coupled to said functional unit and to said activity monitor, operable to control said mode of said functional unit responsive to said activity level and to said throttling parameter.

30. The IC of claim 29, wherein said command occurs responsive to platform software executing on said processor.

31. The IC of claim 29, wherein said command occurs responsive to operating system software executing on said processor.

32. The IC of claim 29, wherein said command occurs responsive to applications software executing on said processor.

* * * * *

UNITED STATES PATENT AND TRADEMARK OFFICE
CERTIFICATE OF CORRECTION

PATENT NO. : 5,719,800
DATED : February 17, 1998
INVENTOR(S) : Mittal et al.

It is certified that error appears in the above-indentified patent and that said Letters Patent is hereby corrected as shown below:

In column 9 at line 59 delete "road" and insert --read--

Signed and Sealed this

Seventh Day of July, 1998

Attest:

BRUCE LEHMAN

Attesting Officer

Commissioner of Patents and Trademarks